H. E. DOERR.
COMBINED YOKE AND COUPLING SHANK.
APPLICATION FILED JUNE 7, 1915.
1,246,400.
Patented Nov. 13, 1917.
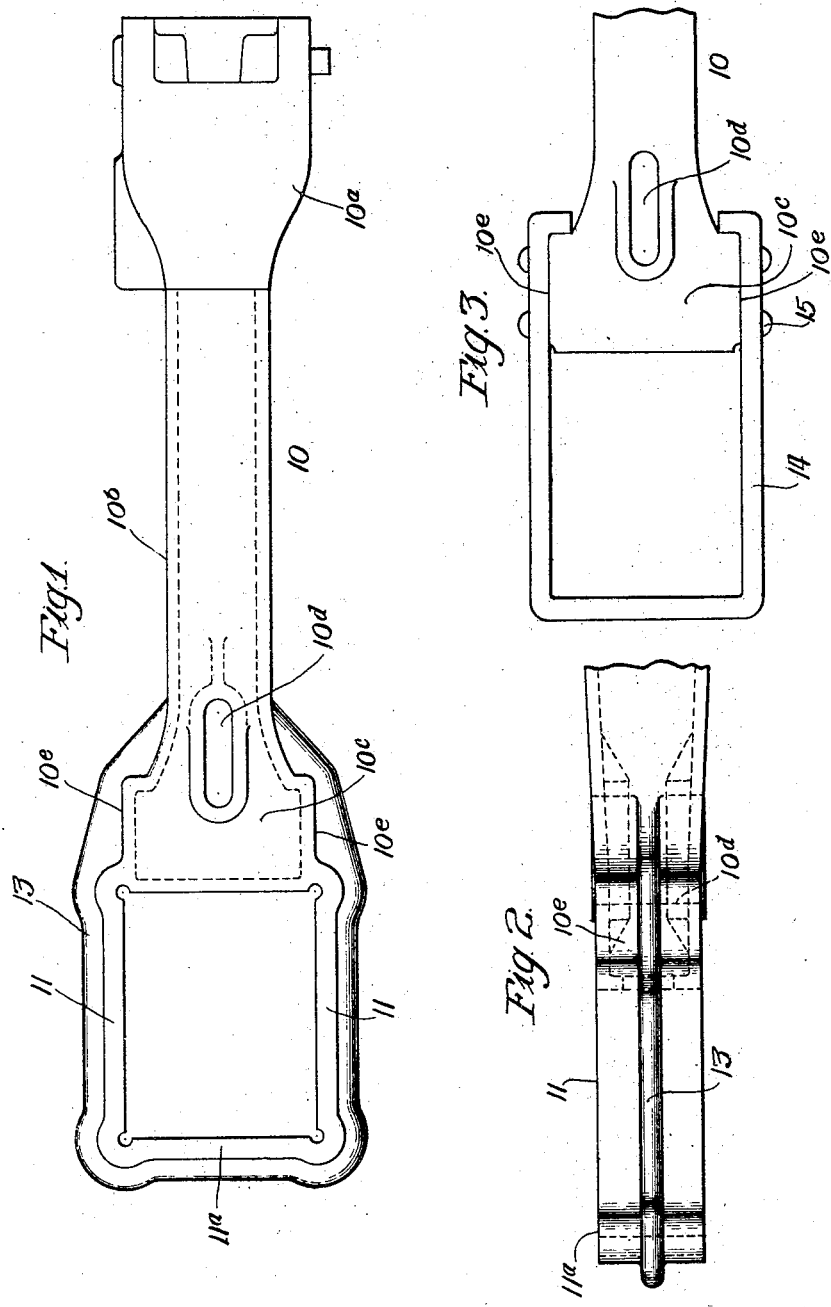
Inventor
Harry E. Doerr
by Sheridan, Wilkinson & Scott
Attys.

UNITED STATES PATENT OFFICE.

HARRY E. DOERR, OF ST. LOUIS, MISSOURI, ASSIGNOR TO SCULLIN-GALLAGHER IRON & STEEL COMPANY, OF ST. LOUIS, MISSOURI, A CORPORATION OF MISSOURI.

COMBINED YOKE AND COUPLING-SHANK.

1,246,400. Specification of Letters Patent. Patented Nov. 13, 1917.

Application filed June 7, 1915. Serial No. 32,644.

*To all whom it may concern:*

Be it known that I, HARRY E. DOERR, a citizen of the United States, residing at St. Louis, in the State of Missouri, have invented certain new and useful Improvements in Combined Yokes and Coupling-Shanks, of which the following is a specification.

This invention relates to improvements in combined yokes and coupler shanks, and has for its object to provide a device of that nature in which the yoke used with a draft gear is formed integrally with the butt of the coupler.

In the use of a device of this nature it often happens that one of the yoke arms, or a portion of the yoke, becomes broken, which would ordinarily necessitate the scrapping of the entire coupler yoke, causing considerable expense. To overcome this, I so construct my coupler butt that while the yoke arms are formed integrally therewith, should a portion of the yoke become broken, the arms may be sawed or otherwise cut off from the butt and by chipping down a rib on each side of the latter and drilling suitable holes therethrough it is possible to attach an ordinary yoke strap thereto. In this way I am enabled to initially gain the advantage of the integral structure both as to its saving in manufacture and ease in installation, and in addition it is not necessary to scrap the entire coupler when the yoke is destroyed or broken.

I have described one embodiment of my invention in the following specification and shown it in the accompanying drawings, in which:

Figure 1 is a side elevation of my invention;

Fig. 2 is a plan view of the yoke and a portion of the coupler, and

Fig. 3 is a side elevation of the coupler butt after the integral yoke has been trimmed therefrom and an ordinary yoke or strap attached thereto.

Like numerals refer to like elements in the drawing, in which 10 indicates generally a coupler having the head $10^a$, shank $10^b$ and butt $10^c$. The latter is formed with the suitable key aperture $10^d$ and is also constructed substantially rectangular in cross section in the form shown with the parallel opposite sides $10^e$. Projecting rearwardly from and integrally formed with the coupler butt $10^c$ are the yoke arms 11 having the rear wall $11^a$ extending therebetween and formed integral therewith. A reënforcing or strengthening rib 13 extends from adjacent the juncture of the coupler butt with the coupler shank over the sides $10^e$ of the coupling butt, the yoke arms 11, and yoke rear wall $11^a$, this rib being formed integral with and projecting outwardly from all of said members. By the use of this construction it is possible to cast a strong and compact yoke and coupler from steel or similar metal which will save the expense of manufacture and assembling ordinarily required in separately formed yoke and coupler structure.

Should the yoke arms 11 become broken, as sometimes happens, it is only necessary to cut off the arms 11 from the coupler butt $10^c$ and chip or otherwise trim the portions of the rib 13 from the coupler butt and shank. After such trimming the butt $10^c$ remains in the shape shown in Fig. 3 of the drawings, and to it may be readily attached a conventional form of strap or yoke 14, as shown, suitable holes having previously been drilled through the butt $10^c$ to permit the use of rivets 15 to secure the yoke to the coupler.

It will be apparent that this structure permits the obtaining of the advantages cited above in the preamble of this specification. It will also be apparent that the structure shown in the drawings and described above is susceptible of modifications according to the different forms of draft gear used, and I do not wish to be restricted to the form shown or described beyond the scope of the appended claim.

What I claim is:

In a draft rigging, the combination with a coupler having a shank of standard construction, of an integral yoke secured to the yoke engaging faces of the coupler liner blocks, whereby upon stripping of the integral yoke another yoke of standard construction may be secured to said shank.

In testimony whereof, I have subscribed my name.

HARRY E. DOERR.

Witnesses:
HARRY W. DREIBUSS,
CHAS. P. GORMAN.

*Copies of this patent may be obtained for five cents each, by addressing the "Commissioner of Patents, Washington, D. C."*